United States Patent [19]
Blunden et al.

[11] 3,844,228
[45] Oct. 29, 1974

[54] TIE-DOWN SYSTEM FOR RAIL CARS

[75] Inventors: Donald J. Blunden, Southfield;
Israel D. Peisner, Huntington
Woods, both of Mich.

[73] Assignee: Whitehead & Kales Company, River
Rouge, Mich.

[22] Filed: Mar. 19, 1973

[21] Appl. No.: 342,385

[52] U.S. Cl. .................. 105/368 T, 105/369 A
[51] Int. Cl. ............................................ B61d 3/16
[58] Field of Search .................. 105/368 T, 369 A;
280/179 A; 248/361 A, 119 R; 292/60, 266, 278

[56] References Cited
UNITED STATES PATENTS

| | | | |
|---|---|---|---|
| 3,157,133 | 11/1964 | Wojcikowski | 105/368 T |
| 3,187,686 | 6/1965 | DePodesta | 105/368 T |
| 3,465,691 | 9/1969 | Simmons | 105/368 T |
| 3,566,803 | 3/1971 | Blunden | 105/368 T X |

Primary Examiner—M. Henson Wood, Jr.
Assistant Examiner—Gene A. Church
Attorney, Agent, or Firm—Whittemore, Hulbert & Belknap

[57] ABSTRACT

Apparatus for securing a plurality of vehicles on the deck of a transport such as a rail car. The apparatus comprises tie-down assemblies each having a carriage and two chains which secure a vehicle against both fore and aft movement. The carriages are supported in a guide rail extending lengthwise of the deck. Locking means are provided to simultaneously lock all of the carriages in adjusted position, such locking means comprising a rotatable bar having locking lugs interengageable with similar lugs on the carriages.

13 Claims, 7 Drawing Figures

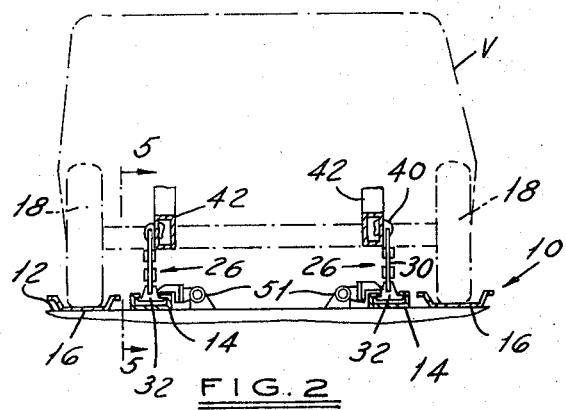
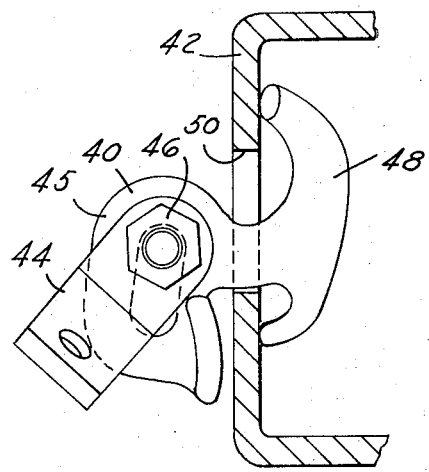
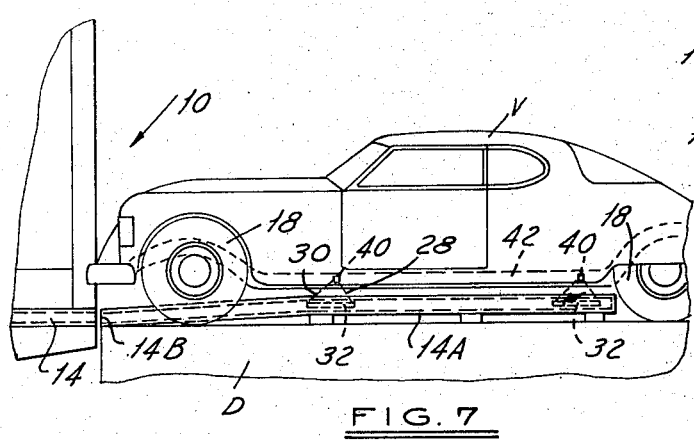
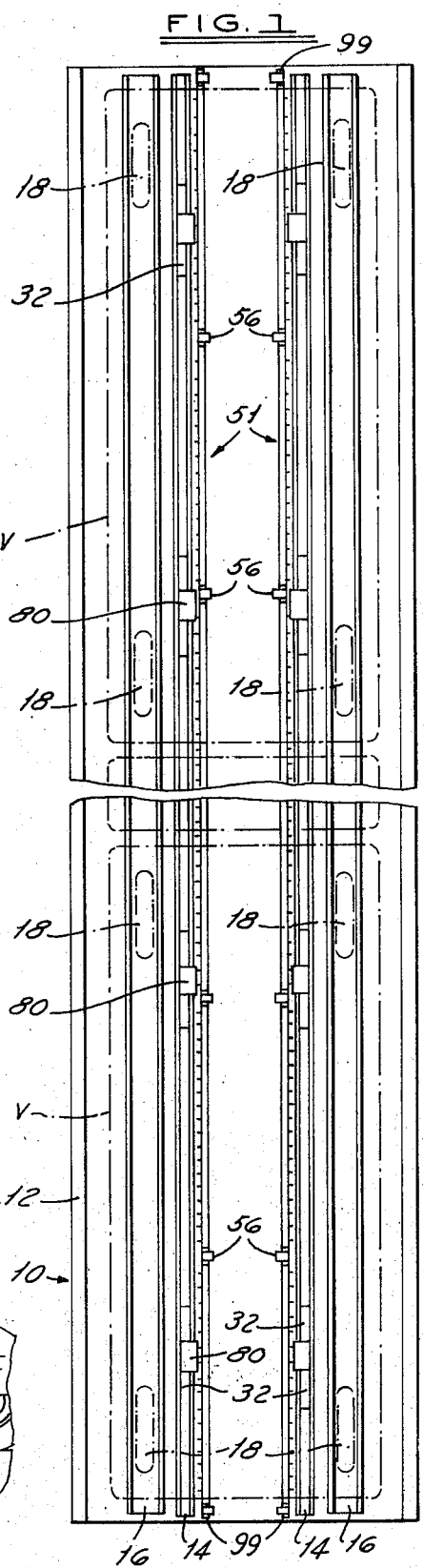

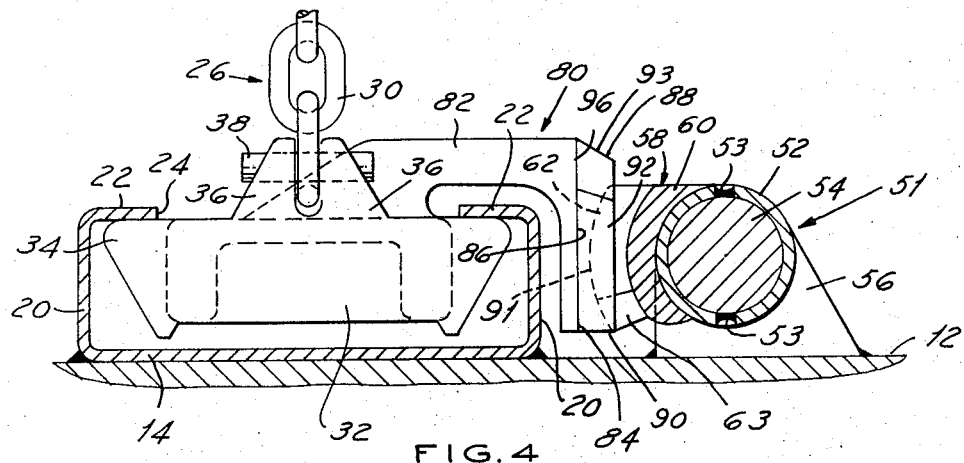
FIG. 4
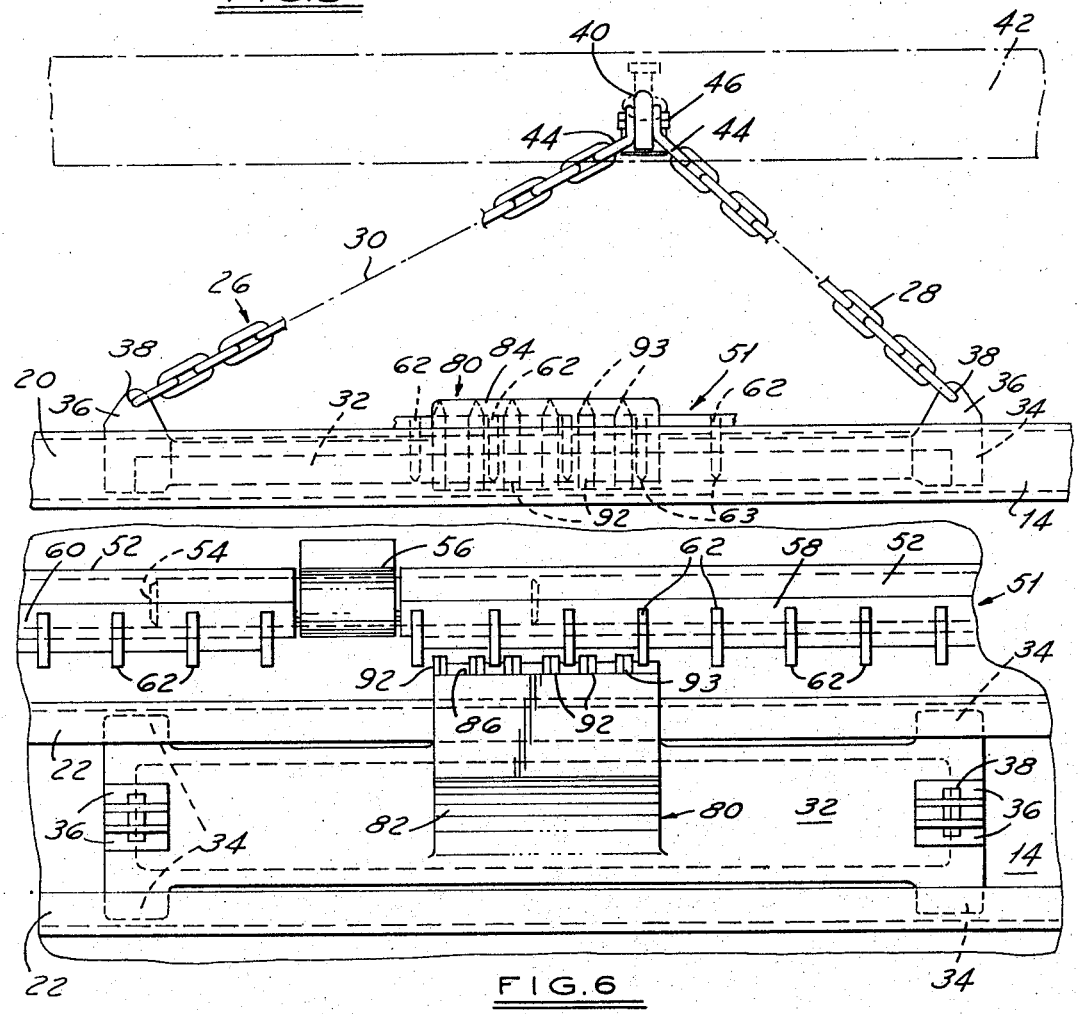
FIG. 5
FIG. 6

TIE-DOWN SYSTEM FOR RAIL CARS

BACKGROUND AND SUMMARY OF THE INVENTION

The apparatus of this invention comprises tie-down assemblies which are adapted to be connected to the underframes of the vehicles by flexible members such as chains in a manner which secures the vehicles against both fore and aft movement. In accordance with a preferred embodiment, each such tie-down assembly has a carriage connected to the underframe of the vehicle by front and rear chains. The carriage and two chains form a triangle. The front chain prevents the vehicle from moving rearwardly and the rear chain prevents the vehicle from moving forwardly. The chains provide a flexible tie so as to reduce the stresses on the underframe of the vehicle.

Further in accordance with a preferred embodiment, the carriages are longitudinally adjustably positioned in a guide rail which extends lengthwise of the deck of the transport. The tie-down assemblies may be hooked to the vehicle underframes just before the vehicles are driven onto the deck of the transport. The carriages may be guided into the open end of the guide rail and dragged along to the point on the deck where it is desired to anchor the vehicle. The chains preferably are set at an angle of about 45° to the deck, so that the carriages may be easily dragged along the guide rail whether the vehicle is loaded in a forward or a reverse direction.

The invention also includes means for locking the carriages in adjusted position in the guide rails which preferably comprises a bar supported for rotation at one side of the rail and having a plurality of locking lugs interengageable with corresponding lugs on each carriage to simultaneously lock all of the carriages when the bar is rotated. The locking lugs are provided throughout substantially the full length of the bar so that the carriages may be locked in virtually any position. The locking bar is preferably operable from one end or the other of the rail car so that the vehicles may be tied down without requiring a workman to enter the rail car and perhaps scratching the vehicles.

The invention provides an extremely low profile tie-down installation. In accordance with the aim of providing a low profile, the rotatable locking bar is preferably disposed at one side of the guide rail so as not to increase the overall height of the installation.

Other subjects and features of the invention will become apparent as the description proceeds, especially when taken in conjunction with the accompanying drawings, wherein:

FIG. 1 is a semi-diagrammatic plan view with portions broken away looking down on the deck of a rail car and showing a tie-down system contructed in accordance with our invention. The tied down vehicles are shown in dot-dash lines.

FIG. 2 is an end view of the tie-down system showing the tie-down chains hooked to the underframe of a vehicle and the carriages locked in the guide rails by the rotatable locking bars.

FIG. 3 is an enlarged fragmentary view with parts in section of a portion of FIG. 2 showing the connection between the hook at the ends of the forward and rear chains of a tie-down device with the vehicle underframe.

FIG. 4 is an enlarged fragmentary view with parts in section and parts in elevation of a portion of FIG. 2, showing the interlocking engagement between the lugs on the locking bar and the lugs on a carriage in a guide rail.

FIG. 5 is a side elevational view as taken on the line 5—5 in FIG. 2, but with portions of the locking bar broken away.

FIG. 6 is a plan view of the structure shown in FIG. 4.

FIG. 7 is a fragmentary side elevational view showing a vehicle on a dock ready to be loaded onto the rail car.

Referring now more particularly to the drawings, a rail car 10 is shown having an elongated horizontal deck 12 which extends lengthwise of the rail car and preferably is open at both ends of the rail car and of sufficient width to carry the vehicles to be transported with at least minimum clearance. The rail car may have a single deck or it may be a multi-level rail car having upper decks in addition to the lower deck.

A pair of laterally spaced parallel channel guides or rails 14 are mounted lengthwise upon the deck 12 of the rail car. They are spaced apart a distance somewhat less than the spacing between the parallel tracks 16 for the ground-engaging wheels 18 of the vehicles V. The tracks 16 are of course parallel to one another and extend the full length of the rail car.

The channel guides 14 have the configuration best shown in FIGS. 2 and 4. They are of generally channel form and are open ended having their bottom walls rigidly secured as by welding or other suitable means upon the deck 12. The open ends of the channel guides 14 preferably terminate substantially flush with the ends of the deck 12 as shown in FIG. 1. Each channel guide 14 has the laterally upright side walls 20 terminating at their upper ends in horizontally inturned flanges 22 whose inner edges are spaced apart to define an elongated slot 24 extending from end to end of the channel guide.

The vehicles V are secured in fixed positions upon the deck of the rail car by front and rear tie-down devices or assemblies 26 secured to the underframe portion of the vehicle on each side thereof. Each such tie-down assembly includes front and rear chains 28 and 30 and a carriage 32. The two tie-down assemblies on one side of a vehicle are disposed one behind the other in positions such that the carriages 32 thereof engage one of the channel guides 14. The other two tie-down assemblies on the other side of the vehicle are disposed one behind the other in positions such that the carriages 32 thereof engage the other channel guide 14. It is not necessary to employ four of the tie-down assemblies 30. Each vehicle may, for example have only two, one having its carriage engaged in one channel guide 14 and the other having its carriage engaged in the same or the other channel guide.

Each carriage is preferably in the form of a strong rigid casting which may be elongated as shown and have the laterally outwardly extending flange or wing portions 34 at the ends which engage under the inturned flanges 22 of the channel guides to prevent the carriage from lifting out of the channel guide. Being open ended, the channel guides 14 permit the carriages to enter from either end of the rail car.

The carriage has a pair of laterally spaced upstanding ears 36 at each end which are formed with aligned apertures to receive a roll pin 38 or similar anchoring device for the end of one of the chains 28,30. The other ends of the chains 28,30 are secured to a hook 40 which is adapted to be connected to an underframe portion 42 of the vehicle. The hook 40 may be of any suitable construction although particularly good results are obtained by the use of an R-hook of the type shown in U.S. Pat. No. 3,215,390 to Lewis K. DeShetler, issued to Whitehead & Kales Company, the assignee of this application.

As shown best in FIGS. 3 and 5, the end link of each chain 28,30 is connected to an angle bracket 44 which is secured to the body portion 45 of the R-hook by a nut and bolt assembly 46 extending through apertures in the bracket 44 and in the R-hook body portion. The R-hook has a retaining portion 48 which is adapted to extend through the aperture 50 in the side of the underframe portion 42 of the vehicle to attach or anchor the tie-down assembly thereto.

Reference is now made particularly to FIGS. 4-6 for a description of the mechanism for locking the carriages and hence securing the vehicles in loaded position on the deck 12 of the rail car. Such mechanism includes an elongated locking member or bar 51 which is parallel to and extends along the inboard side of each channel guide 14. Each of the bars 51 comprises individual elongated tubular bar segments 52 which are arranged in spaced end-to-end relation and are connected by short bar sections 54 telescoped within and secured to the adjacent ends of the segments as for example by welding. As seen, the end portions of the tubular bar segments 52 have elongated slots 53 where the weld between the parts is made. The bars 51 are supported for rotation by the tubular pillow blocks 56 which rotatably receive the connecting sections 54 and are seated upon and secured to the deck 12. The pillow blocks 56 restrain the bars 51 from longitudinal movement by contact with the ends of the bar segments 52. The upper surfaces of the pillow blocks are preferably of the same arcuate size and form as the tubular bar segments 52 and are flush with the upper surfaces of such bar segments so that nothing will catch on either the pillow blocks or the bar segments when the carriages move through the channel guides.

Clamping or locking members 58 are rigidly secured to the bar segments 52 by any suitable means as for example by welding. Such locking members 58 are in the form of elongated arcuate segments 60 having the radially outwardly projecting, circumferentially extending, equally longitudinally spaced locking lugs 62. Such locking lugs are themselves arcuate in form corresponding generally to the curve of the arcuate sections 60 and being tapered or V-shaped at their leading ends as shown at 63 in FIGS. 4 and 5. Preferably, a plurality of locking members 58 are secured to each bar segment 52 in aligned abutting end-to-end relation throughout the entire length thereof to provide a continuous series of locking lugs interrupted only by the pillow blocks 56, thus requiring less accurate positioning of the vehicles which are to be secured. All of the locking lugs 62 between pillow blocks are equally spaced even when two or more locking members 58 are abutted end to end.

The lug locking shoe or section of each carriage is designated 80 and is generally L-shaped, having one arm 82 rigidly secured as by welding or by being cast thereto to the upper surface of the carriage and extending from the carriage generally horizontally over the top of the channel guide 14 to the inboard side thereof. The other arm 84 of the shoe 80 extends generally vertically downwardly between the channel guide 14 and the locking bar 51. The arm 84 is formed with longitudinally equally spaced vertically extending grooves 86 in its inner surface or in other words, the surface thereof facing the locking bar, which grooves intersect the upper and lower end surfaces 88 and 90 of the arm 84. Such grooves 86 separate and define the transversely extending locking lugs 92. The base of each groove 86 is straight as shown at 96 for about one-half its length and may be curved as shown in FIG. 4 on an arc corresponding generally to the arc of curvature of the outer surfaces 91 of the locking lugs 62 on the rotatable locking bar 51. The lugs 92 are tapered or V-shaped as shown at 93 at the ends facing the tapered ends of the locking bar lugs 62. As seen in FIG. 6, the lugs 92 on the shoes are spaced apart shorter distances than the lugs on the locking bar so that two of the shoe lugs will fit between a pair of lugs on the locking bar. This precise relationship while preferred may be varied however, it only being necessary that the locking lugs of the carriage interengage or interfit with the locking lugs of the bar 51.

When the carriages are engaged in the channel guides 14, the arms 84 of the carriage shoes 80 are disposed directly opposite the locking bar 51 on the inboard side thereof as shown in FIGS. 4 and 6. The shoe lugs 92 extend parallel to the lugs 62 on the locking bar in a position such that upon rotation of the locking bar the locking bar lugs 62 will interengage with the lugs on the shoes, entering readily through the straight end portions 96 of the grooves. As seen in FIG. 4, the carriage is capable of some lateral movement in the channel guide but not so much as would permit the shoe lugs from moving away from and skipping over the lugs on the locking bar.

Both ends of the locking bar 51 extend substantially flush with the ends of the rail car. Such locking bar ends are preferably formed with flats 99 or an aperture or the like to receive a tool or crank by means of which the bar may be readily rotated manually between retracted and locked positions.

If the locking bar is considered to be too long for convenient operation from one end, it may if desired be cut in half, that is transversely severed at or near the midpoint in which event the locking lugs adjacent one end of the rail car would be simultaneously operated by one of the locking bar halves, and the locking members adjacent the other end of the rail car would be simultaneously operated by the other locking bar half.

Referring again to FIG. 5, it is noted that each tie-down assembly 26 has a front chain 28 and a rear chain 30. The front and rear chains and the carriage of each tie-down assembly form a triangle. The front chain extends downward from hook 40 in a forward direction to its end where it is attached to the front end of the carriage, and the rear chain 30 extends downward from hook 40 in a rearward direction to its end where it is connected to the rear end of the carriage. Hence when the vehicle is secured by a tie-down assembly 26, it is thereby restrained from movement either in a forward or a rearward direction, the front chain applying forward tension and the rear chain applying rearward tension. When loading a vehicle in a forward direction and pulling a tie-down assembly 26 hooked to the underframe and with its carriage engaged in a channel guide 14, it is the rear chain 30 which pulls the tie-down assembly along. When the vehicle is tied down however it must be restrained from movement in both directions and accordingly a simple rear chain would not be sufficient particularly for the front tie-down assemblies. The front chains 28 prevent rearward shifting of the tied down vehicle and the rear chain prevents forward shifting thereof. The body portion 45 of the hook 40 to which the chains are connected and the hook portion 48 are close to one another so that the chains will not swing appreciably when under stress and hence will not allow significant movement of the tied down vehicle. The triangle formed by the two chains 28 and 30 and the carriage 32 keeps all members tight as long as the frame 42 of the vehicle does not depress too much. This assures evenness of movement as the tie-down assembly 26 moves along the guide 14 and assures proper action under dynamic forces.

The front chain 28 preferably forms an angle of about 45° to the channel guide 14 to both hold down the vehicle and prevent it from moving backwards. The rear chain 30 serves to hold down the vehicle and prevent it from moving forward. It also preferably is about 45° to the channel guide although since it serves also to drag the carriage along in the channel during normal forward loading of the vehicles, it is sometimes set at an angle of as low as 30° as shown. The angle of both chains may vary, but preferably is between about 30° and about 60° to the channel guide 14. The chains are of a length depending upon the height of the vehicle underframe such that they will be under tension when the vehicle is tied down on the deck of the rail car. The tension in the chains places the carriage 32 in compression.

The vehicles may be loaded on the rail car by drivers or by a suitable loading mechanism. FIG. 7 shows the vehicles on a loading dock D before they are moved onto the rail car. Parallel channel guides 14A, spaced apart the same distance as channel guides 14 on the rail car, are mounted on the dock. The channel guides 14A are openended and of the same cross-section as channel guides 14. The rail car is shown in position for loading adjacent the dock with the ends of the channel guides 14 on the rail car substantially abutting the open ends 14B of the channel guides 14A on the dock. Preferably the channel guides 14A are elevated slightly with respect to the top surface of the dock on which the vehicle wheels travel so that the chains 28,30 of each tie-down assembly may be hooked to a vehicle underframe and the carriage inserted into the opposite open ends (not shown) of the channel guides 14A without putting tension on the chains.

The channel guides 14A lead down to their open ends 14B so that as the vehicle is moved from the dock to the rail car, the carriages 32 move from channel guides 14A on the dock to channel guides 14 on the rail car and place the chains 28,30 in tension. The amount of tension in the chains and also the amount the vehicle springs are depressed depends on the shape of the dock channel guides 14A and the amount of slack if any in the chains when the tie-down assemblies are hooked to the vehicles and installed in the elevated part of the channel guides 14A.

After a line of vehicles has been loaded in proper position on the deck 12 of the rail car, whether by power mechanism or by individual drivers, a tool may be applied to the ends of the locking bars 51 to rotate them to the FIG. 4 position which is the locking position. They of course retain that position because of the weight of locking segments 60 and lugs 62 until positively reverse rotated. In the locking position, the locking lugs of the locking bar 51 interengage with those of the carriages. Because the locking bar lugs extend substantially continuously throughout the full length of the locking bars, preferably interrupted only by the pillow blocks which support the bars for rotation, the vehicles need to be only roughly positioned along the length of the rail car. No matter where the vehicles are, the locking lugs of the carriages and on the locking bars will interengage. Preferably the length of the shoes on the carriages provided with the locking lugs is sufficiently greater than the width of a pillow block that even if a carriage is stopped with its shoe opposite a pillow block at least some of the shoe lugs will be interengaged with those on the locking bar on one or both sides of the pillow block. The tapered noses on the confronting of the locking lugs will prevent interference when the locking bars are rotated and will slightly adjust the longitudinal position of the vehicles if necessary. All of the carriages will be locked simultaneously since all of the locking segments are disposed in a line on one side of the locking bars. The chains provide a flexible tie to the underframe of the vehicle so as to reduce the stresses thereon. As noted above, the hook is so constructed that the chain ends terminate close to the point of connection to the underframe of the vehicle and hence will minimize any possible movement of the vehicle.

Unlocking of the vehicles is accomplished simply by reverse rotation (clockwise in FIG. 4) of the locking bars 51 away from the FIG. 4 position to disengage the locking lugs. The locking bars rotate to an unlocking position far enough that the locking segments pass overcenter and will therefore retain the unlocked position until positively rotated back to the locking position of FIG. 4.

What we claim as our invention is:

1. Apparatus for securing a plurality of vehicles on the elongated deck of a transport, comprising guide means including a rail secured upon and extending lengthwise of the deck, carriages slidably mounted on said rail for movement lengthwise thereof, means for securing said carriages against movement with respect to said rail in selected positions along the length thereof, means for connecting each carriage to the underframe of a vehicle comprising a rear flexible linear member extending from the rear portion of said carriage, a front flexible linear member extending from the front portion of said carriage, and a connecting member joined to the ends of said linear members and adapted to be connected to the underframe of a vehicle so that said rear linear member extends downwardly and rearwardly therefrom to said carriage to restrain the vehicle from forward movement and said front linear member extends downwardly and forwardly therefrom to said carriage to restrain the vehicle from rearward movement, said rail being of sufficient length to secure a plurality of vehicles arranged in tandem along the length thereof, and said front and rear linear members when connected to the underframes of the vehicles by said connecting members forming angles to said rail such that said carriages may be dragged along said rail by the vehicles during either forward or rearward loading.

2. The apparatus defined in claim 1, wherein said linear members for each carriage form an angle to the said rail of between about 30° and about 60° when said connecting member is connected to the underframe of a vehicle.

3. The apparatus defined in claim 1, wherein said connecting member joined to the ends of the linear members for each carriage is in the form of a hook having a body portion to which said linear members are connected and a hook portion adapted to be connected to the underframe of a vehicle, said hook and body portions being disposed close to one another to reduce the distance the vehicle can move relative to said carriage.

4. The apparatus defined in claim 3, wherein said linear members for each carriage are placed in tension when said connecting member joined to the ends thereof is connected to the underframe of a vehicle as aforesaid and said carriage is placed in compression by said linear members.

5. The apparatus defined in claim 4, wherein said linear members for each carriage form angles of about 45° to said rail when said connecting member joined to the ends thereof is connected to the underframe of a vehicle.

6. Apparatus for securing a plurality of vehicles on the elongated deck of a transport, comprising guide means including a rail disposed upon and extending lengthwise of the deck, carriages slidably engageable with said rail for movement lengthwise thereof, means for connecting said carriages to the vehicles, and locking mechanism operable to lock said carriages against movement and thereby secure the vehicles in substantially fixed position on the deck, said locking mechanism comprising an elongated member mounted on the deck adjacent said rail and having locking means thereon spaced apart longitudinally thereof, said member being movable between first and second positions, said carriages having locking means thereon, said locking means on said member being simultaneously engageable with said locking means on said carriages in said first position of said member to secure the vehicles as aforesaid in selected positions on the deck along the length of said rail and being disengageable from the locking means on said carriages in said second position to release the vehicles, said rail being of sufficient length to secure a plurality of vehicles arranged in tandem along the length thereof.

7. Apparatus for securing a vehicle on the elongated deck of a transport, comprising guide means including a rail disposed upon and extending lengthwise of the deck, a carriage slidably engageable with said rail for movement lengthwise thereof, means for connecting said carriage to the vehicle, and locking mechanism operable to lock said carriage against movement and thereby secure the vehicle in substantially fixed position on the deck, said locking mechanism comprising an elongated member mounted on the deck parallel to said rail along one side thereof and having a plurality of locking lugs spaced apart longitudinally thereof, said elongated member being movable between first and second positions, said carriage having locking lugs upon the side thereof adjacent said elongated member spaced apart lengthwise of said elongated member, said locking lugs on said elongated member being engageable with the locking lugs on said carriage in said first position of said elongated member to secure the vehicle as aforesaid and being disengageable from the locking lugs on said carriage in said second position to release the vehicle.

8. The apparatus defined in claim 7, wherein means are provided for mounting said elongated member on the deck for rotation between said first and second positions, said locking lugs on said elongated member projecting radially outwardly therefrom and extending transversely thereof.

9. The apparatus defined in claim 8, wherein said locking lugs on said carriage extend transversely with respect to said elongated member, the confronting ends of the lugs on said carriage and on said elongated member being tapered to preclude interference during rotation of said elongated member from the second to the first position thereof.

10. Apparatus for securing a plurality of vehicles on the elongated deck of a transport, comprising guide means including a channel secured upon and extending lengthwise of the deck, carriages slidably engageable with said channel, means for connecting said carriages to the vehicles, said carriages being movable along said channels when the vehicles are advanced lengthwise of the deck during loading, and locking mechanism operable to lock said carriages against movement and thereby secure the vehicles in substantially fixed positions upon the deck, said locking mechanism comprising an elongated member mounted on the deck for rotation parallel to said channel along one side thereof, said elongated member having a plurality of spaced locking lugs projecting radially outwardly therefrom and extending circumferentially thereof, said carriages each having shoes extending between said channel and said elongated member, locking lugs on said shoes spaced apart longitudinally and extending transversely with respect to said elongated member, said elongated member being rotatable between first and second positions, said locking lugs on said elongated member being interengageable with the locking lugs on said shoes in said first position of said elongated member to secure the vehicles as aforesaid and being disengageable from the locking lugs on said shoes in said second position to release the vehicles.

11. The apparatus defined in claim 10, wherein the confronting ends of the lugs on said shoes and the lugs on said elongated member are tapered to preclude interference during rotation of said elongated member from the second to the first position thereof.

12. The apparatus defined in claim 10, wherein said means connecting said carriage to the vehicle comprises a rear flexible linear member connected at one end to the rear portion of said carriage, a front flexible linear member connected at one end to the front portion of said carriage, and a connecting member joined to the opposite ends of said linear members and adapted to be connected to the underframe of the vehicle so that said rear linear member extends downwardly and rearwardly therefrom to said carriage to restrain the vehicle from forward movement and said front linear member extends downwardly and forwardly therefrom to said carriage to restrain the vehicle from rearward movement.

13. The apparatus defined in claim 12, wherein said linear members form angles to said channel of between about 30° and about 60°

* * * * *